(12) United States Patent
Bodmann et al.

(10) Patent No.: US 10,843,671 B2
(45) Date of Patent: Nov. 24, 2020

(54) HOUSING BLOCK, IN PARTICULAR FOR A HYDRAULIC UNIT OF AN ELECTRONICALLY SLIP-CONTROLLABLE VEHICLE BRAKE SYSTEM

(71) Applicant: Robert Bosch GmbH, Stuttgart (DE)

(72) Inventors: Jochen Bodmann, Oberstenfeld (DE);
Oliver Gaertner, Abstatt (DE);
Juergen Reiner, Gestratz (DE);
Caroline Seywald, Oberreute (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/324,777

(22) PCT Filed: Jun. 8, 2017

(86) PCT No.: PCT/EP2017/063924
§ 371 (c)(1),
(2) Date: Feb. 11, 2019

(87) PCT Pub. No.: WO2018/028852
PCT Pub. Date: Feb. 15, 2018

(65) Prior Publication Data
US 2019/0225203 A1  Jul. 25, 2019

(30) Foreign Application Priority Data

Aug. 11, 2016  (DE) .......................... 10 2016 214 994

(51) Int. Cl.
*B60T 8/40* (2006.01)
*B60T 8/42* (2006.01)
(Continued)

(52) U.S. Cl.
CPC ............ *B60T 8/4275* (2013.01); *B60T 8/368* (2013.01); *B60T 17/06* (2013.01); *F15B 1/24* (2013.01)

(58) Field of Classification Search
CPC ......... B60T 8/368; B60T 8/4275; B60T 17/06
(Continued)

(56) References Cited

U.S. PATENT DOCUMENTS 5,618,085 A * 4/1997 Siegel ..................... B60T 8/368
                                                    303/113.1
5,857,753 A * 1/1999 Gowda ................... B60T 8/368
                                                    138/31

(Continued)

FOREIGN PATENT DOCUMENTS

DE    41 18 834 A1    12/1992
DE    44 40 147 A1    5/1996
(Continued)

OTHER PUBLICATIONS

International Search Report corresponding to PCT Application No. PCT/EP2017/063924 dated Jun. 8, 2017 (German and English language document) (7 pages).

*Primary Examiner* — Christopher P Schwartz
(74) *Attorney, Agent, or Firm* — Maginot, Moore & Beck LLP

(57) ABSTRACT

A drilling tool, in particular a rock drilling tool, for a portable machine tool, includes a drill head, in particular a hard metal drill head. The drill head includes a drill shaft connected, in particular integrally with the drill head, and a rotational axis. The drill shaft is configured as one piece, has a guide section with guide groove winding in a spiral-shaped about the drill shaft for transporting away drilling dust, and has a securing section provided for detachably securing the drilling tool to a machine tool. The guide section has a diameter reinforcement at a drill head support region of the guide section neighboring, in particular adjacent to, the drill head.

12 Claims, 1 Drawing Sheet

(51) Int. Cl.
    *B60T 8/36*     (2006.01)
    *B60T 17/06*     (2006.01)
    *F15B 1/24*     (2006.01)

(58) Field of Classification Search
    USPC ......... 138/30, 31; 303/10, 11, 87, 89, 119.3,
                                    303/116.4; 417/440
    See application file for complete search history.

(56) References Cited

U.S. PATENT DOCUMENTS

| | | | |
|---|---|---|---|
| 6,398,315 B1 * | 6/2002 | Dinkel .................... | B60T 8/368 |
| | | | 303/113.1 |
| 6,682,325 B1 * | 1/2004 | Beck ....................... | B60T 8/368 |
| | | | 417/440 |
| 7,264,317 B2 * | 9/2007 | Beck ....................... | B60T 8/368 |
| | | | 303/10 |
| 8,783,793 B2 * | 7/2014 | Terashima .............. | B60T 8/368 |
| | | | 138/31 |

FOREIGN PATENT DOCUMENTS

| | | |
|---|---|---|
| DE | 197 12 686 B4 | 1/1998 |
| JP | H10-273039 A | 10/1998 |
| JP | H11-139285 A | 5/1999 |
| JP | 2000-509350 A | 7/2000 |
| JP | 2009-262855 A | 11/2009 |
| JP | 2016-028909 A | 3/2016 |
| WO | 98/12088 A1 | 3/1998 |

\* cited by examiner

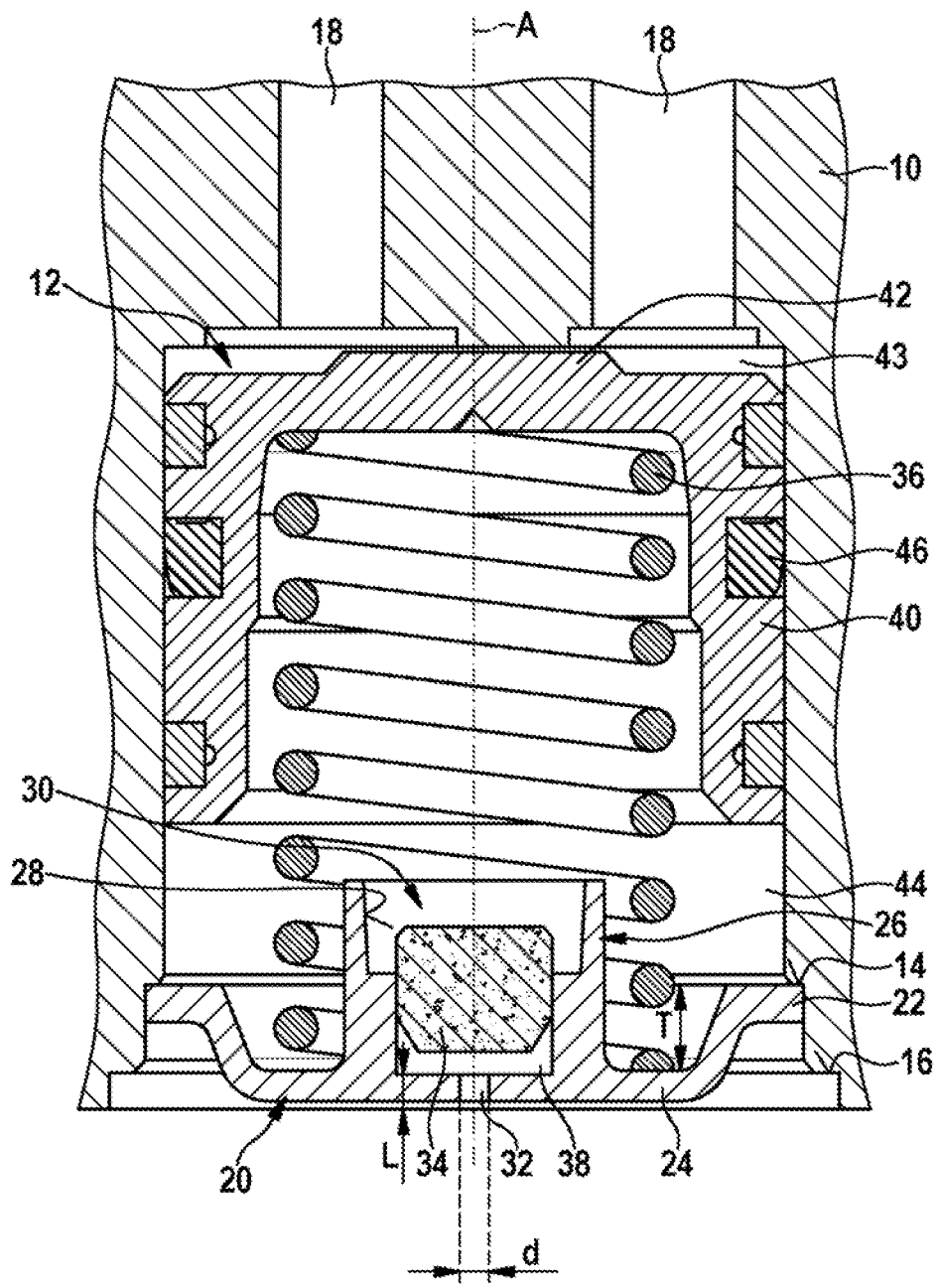

HOUSING BLOCK, IN PARTICULAR FOR A HYDRAULIC UNIT OF AN ELECTRONICALLY SLIP-CONTROLLABLE VEHICLE BRAKE SYSTEM

This application is a 35 U.S.C. § 371 National Stage Application of PCT/EP2017/063924, filed on Jun. 8, 2017, which claims the benefit of priority to Serial No. DE 10 2016 214 994.6, filed on Aug. 11, 2016 in Germany, the disclosures of which are incorporated herein by reference in their entirety.

BACKGROUND

The disclosure concerns a housing block, in particular for a hydraulic unit of an electronically slip-controllable vehicle brake system, with the features disclosed herein.

Such a housing block is known for example from DE 44 40 147 A1. In this housing block, an opening of a cavity is covered by a protective cap, wherein a gap for venting the cavity is provided between the protective cap and the cavity. To prevent fluid from the environment from penetrating into the cavity, it is proposed to seal the protective cap against the cavity by means of at least one peripheral sealing lip and provide an opening at the sealing lip. This opening is arranged at the lowest peripheral point of the sealing lip. The protective cap is then fixed to a separately provided cover which is attached to the opening of the cavity by means of a securing ring. An opening in the securing ring is also situated in the region of the lowest point. As a whole, this design of a venting device is relatively complex in relation to the number of components and the necessary orientation of components during assembly.

In addition, DE 197 12 686 B4 discloses a hydraulic unit on which a collection space for leakage fluid is formed. A drainage bore connects the collection space to the environment. A cylindrical body is pressed into this drainage bore and allows drainage of leakage fluid from the collection space towards the environment, but prevents the penetration of fluids from the environment into the collection space in the opposite direction. The cylindrical body consists of a porous sintered material.

SUMMARY

In contrast, an object with the features disclosed herein has the advantage of allowing pressure balancing between a cavity and the environment in a particularly economic fashion, while simultaneously increasing the protection of this cavity at least from sustained loading with liquids and vapors. The penetration of fluids and vapors from the environment to the cavity is reduced to a minimum or is delayed by the measures disclosed herein. Before they are anchored on the housing block, the cover and pressure-balancing element may be formed as one assembly and be matched to each other in dimensions or geometry.

Further advantages or advantageous refinements of the disclosure arise from the description which follows.

Because the pressure-balancing element allows through-flow in both directions, pressure medium which has penetrated into the cavity can drain out again through the pressure-balancing element towards the outside. In the case of a piston of a pressure medium accumulator received movably in the cavity, this drainage is supported by the piston movement in that, as soon as a piston executes a travel in the direction of reducing the size of the cavity, it causes a pressure rise which pumps the introduced pressure medium towards the outside. Provision of a throttle bore firstly reduces the probability that pressure medium from the outside will hit the pressure-balancing element directly, it decreases the quantity of pressure medium penetrating the cavity, and also lowers the fluid pressure acting from the outside on the pressure-balancing element so far that the pressure-balancing element does not suffer any damage.

Thanks to a receiving device arranged downstream of the pressure-balancing element, pressure medium which has nonetheless penetrated into the cavity collects centrally at the location of the pressure-balancing element and the throttle opening which opens towards the outside. Any introduced pressure medium thus gradually runs out of the cavity simply by force of gravity. The pressure medium receiving device on the cover may also, with its outer form, serve as a centering means for an elastic element arranged in the cavity, in particular for a coil spring. In the case of a piston accumulator for pressure medium, this guarantees that the piston is loaded with a return force which acts as centrally as possible on the piston and which therefore firstly counters a tilting of the piston or the creation of transverse forces inhibiting the piston movement and simultaneously, because it evens out the transverse forces acting on the sealing element, improves the efficacy of a sealing element which is provided on the piston and seals the two storage chambers against each other.

BRIEF DESCRIPTION OF THE DRAWINGS

An exemplary embodiment of the disclosure is shown in the drawing and explained in more detail in the description which follows. The only FIGURE shows, in longitudinal section along a longitudinal axis A, an extract from a housing block 10 with cavity 12 formed thereon.

DETAILED DESCRIPTION

The only FIGURE shows an extract from a housing block 10, in particular a housing block for a hydraulic unit of a slip-controllable vehicle brake system. On the extract shown, a cavity 12 is formed which preferably has a cylindrical cross-section. The cavity 12 has a closed end arranged in the interior of the housing block 10, and an end which is open towards an outside of the housing block 10. Pressure medium is supplied to the cavity 12 via channels 18 at the closed end. In the region of the open end, a wall delimiting the cavity 12 on the periphery is set back several times at right angles, and thus forms two ring steps 14, 16 of different diameter which succeed each other from outside to inside. The ring step 14 of smaller diameter is situated further into the interior of the cavity 12, while the ring step 16 of larger diameter faces the opening of the cavity 12. The two ring steps 14, 16 each form a shoulder formed at right angles, oriented transversely to a longitudinal axis A-A, and surrounding the cavity 12.

The opening of the cavity 12 is closed by a cover 20 which along its outer periphery lies in regions on the inner first ring step 14. The outer ring step 16 of larger diameter is designed to be plastically deformed by means of a caulking tool. This deformation creates a caulking bead from the housing material, which on the peripheral side overlaps the cover 20 in portions from the outside and thus anchors this by form fit to the housing block 10 (not shown).

The cover 20 is preferably a component made from steel or sheet steel in a material removal method, for example by turning. It has a plate-like base form with a radially protruding peripheral collar 22, and a plate bottom 24 enclosed by the collar 22 and lowered relative thereto. With the end face of its collar 22 facing away from the plate bottom 24, the cover 20 rests on the shoulder formed by the ring step 14; the plate bottom 24 is open towards the cavity 12. In the center of the plate bottom 24 is a peg 26 which protrudes into the interior of the cavity 12 over a depth T beyond the lowering of the plate bottom 24. This peg 26 is configured as a hollow body formed by a blind hole 28 stepped once towards the inside in its inner diameter, and forms a receiving device 30. A throttle opening 32 stepped once in its inner diameter penetrates the plate bottom 24, and opens into the interior of the receiving device 30 at the bottom and also to the environment at the opposite end. The throttle opening 32 has a length L and a diameter d, wherein the dimensions of L and d are selected such that a quotient of L/d assumes a value of between 1.0 and 2.0, preferably less than 1.5. The largest diameter of the throttle bore 32 is situated at the opening into the receiving device 30.

In the smaller-diameter portion of the blind hole 28 of the peg 26 facing the plate bottom 24, and hence in the interior of the receiving device 30, a pressure-balancing element 34 is arranged with an axial distance from the plate bottom 24. At the end, this covers the opening cross-section of the throttle opening 32 and with its outer periphery lies on the wall of the smaller-diameter portion of the stepped blind hole 28, and in portions protrudes axially into the larger-diameter portion of the blind hole 28 of the peg 26. The pressure-balancing element 34, the plate bottom 24 and the wall of the blind hole 28 together enclose an intermediate space 38. The pressure-balancing element 34 may be fixed to the peg 26 and cover 20 for example by gluing, screwing or pressing into the blind hole 28.

The pressure-balancing element 34 is permeable to gaseous and liquid media and allows passage of these media both in a first direction from the environment into the interior of the cavity 12 and in a second opposite direction, i.e. from the interior of the cavity 12 to the environment. For this, the pressure-balancing element 34 comprises a porous filter body preferably made of a foamed and/or sintered material, which may for example be made from a plastic, metal and/or ceramic material at low cost.

The outer periphery of the receiving device 30 serves for centering a coil spring 36 arranged in the interior of the cavity 12, and for this is preferably formed so as to be cylindrical or conical, i.e. tapering in the direction of the cavity 12. The inner diameter of the coil spring 36 is slightly larger than the maximum outer diameter of the peg 26 forming the receiving device 30, so that when the cover 20 is mounted on the housing block 10, it can be inserted axially into the interior of the already fitted coil spring 36. With its first end, the coil spring 36 rests on the region of the plate bottom 24 surrounding the peg 26, and the opposite second end lies on the side facing the cavity 12 of a piston floor of a piston 40 formed as a hollow cylinder. Said piston is movably received in the interior of the cavity 12. It divides the cavity 12 into a first storage chamber 43 which can be filled with a pressurized fluid, and a gas-filled second storage chamber 44 which is sealed against the first and contains the coil spring 36. The two storage chambers 43, 44 are sealed against each other in order to prevent an undesirable transfer of gas from the second storage chamber 44 into the fluid-filled first storage chamber 43. The latter is supplied via a sealing and guiding arrangement 46 which for this is arranged in an annular peripheral recess of the piston 40.

Function Method of the Venting Device:

The first storage chamber 43 is loaded with a pressurized fluid against the return force of the coil spring 36. Here, the spring force and the compression force applied by the fluid pressure on the piston surface act against each other. If said compression force is greater than the spring force, the piston 40 moves towards the cover 20, whereby the volume of the second storage chamber 44 containing the coil spring 36 is reduced while the volume of the first storage chamber 43 increases accordingly. If however the compression force is lower than the returning spring force, the piston 40 moves in the opposite direction and the volume of the first storage chamber 43 diminishes while the volume of the second storage chamber 44 increases to around the same extent. The size reduction of the second storage chamber 44 without the proposed venting device would necessarily be accompanied by an increase in the gas pressure in the second storage chamber 44. This pressure increase could firstly lead to gas from the second storage chamber 44 undesirably flowing past the sealing arrangement 46 into the first fluid-filled storage chamber 43. Furthermore, the transfer of gas to the first storage chamber 43 could lead to the formation of a reduced pressure in the second storage chamber 44, as soon as the piston 40 reverses its movement direction following the pressure medium transfer and returns to its starting position. Such pressure changes in the second storage chamber 44 depend on the prevailing ambient conditions and would have an unpredictable negative influence on the piston movement and hence on the function characteristics of the piston accumulator. A venting device on which the disclosure is based avoids this by allowing a pressure balancing between the second storage chamber 44 and the environment.

The object of the disclosure is to propose a venting device which prevents pressure fluctuations in the second storage chamber 44, without fluids, gases or vapors from the environment immediately filling the second storage chamber 44 with medium, and without any introduced medium remaining in the second storage chamber 44 for a long time.

For this, the proposed venting device or device for ventilation firstly comprises a throttle opening 32 which prevents fluids from the environment from being able to directly hit the pressure-balancing element 34 of the venting device downstream of the throttle opening 32, and being able to damage this. Furthermore, the throttle opening 32 reduces the quantity of inflowing medium.

The intermediate space 38 provides a buffer volume which prevents the pressure-balancing element 34 from being directly impacted by medium penetrating the throttle opening 32, and means that no defined minimum volume of inflowing medium is required to pass as far as the pressure-balancing element 34. Any medium present in the intermediate space 38 can gradually flow back towards the outside through the throttle opening 32 so that the buffer chamber can be kept largely free from pressure medium.

The pressure-balancing element 34 of the venting device arranged downstream of the throttle opening 32 is preferably configured as a porous sintered element. It is permeable to both liquids and vapors, wherein this permeability exists in both directions, i.e. from the environment towards the cavity 12 and from the cavity 12 towards the environment. The pressure-balancing element 34 cooperates with the throttle opening 32 and the intermediate space 38 as a throttle element, which reduces the speed with which gases, vapors and/or liquids pass from the environment into the cavity 12.

Because of this reduced passage speed, only a relatively small quantity of fluid gathers in the downstream pot-like receiving device 30. The penetrating fluid may be stored in the receiving device and, over time, flows back under gravity through the pressure-balancing element 34 and the intermediate space 38 to the throttle opening 32, and from there finally back to the environment. This process is supported by a movement of the piston 40 in the cavity 12, wherein the resulting pressure rise in the interior of the second storage chamber 44 increases the outflow speed of the fluid.

To summarize, accordingly a multi-stage device is proposed for venting the cavity 12, which allows pressure-balancing of the cavity 12 relative to the environment, ensures that only small quantities of liquids or gas penetrate into the cavity 12, allows pressure medium which has been introduced to flow out from the cavity 12 again quickly and without additional measures, and supports the outflow of pressure medium through the movement of the piston 40. Also, the proposed venting device can be formed as one assembly with the cover 20, so it can be handled and anchored to the housing block 10 without additional expense. The complexity required substantially consists of a pressure-balancing element 34 (available at low cost) and an additional working step for anchoring this on a specially designed cover 20.

Evidently, changes or additions to the exemplary embodiment described are conceivable without deviating from the basic concept on which the disclosure is based.

The invention claimed is:

1. A housing block for a hydraulic unit of an electronically slip-controllable vehicle brake system, the housing block comprising:
    a cavity formed on the housing block and open towards an outside of the housing block;
    a cover closing an opening of the cavity against the environment; and
    a device configured to vent the cavity to the environment, the device including:
        a throttle opening formed on the cover, the throttle opening having a length and a diameter; and
        a pressure-balancing element configured to be attached to that side of the cover facing the cavity, the pressure-balancing element covers an opening cross-section of the throttle opening in the cavity,
    wherein the pressure-balancing element is permeable to gaseous and liquid media.

2. The housing block as claimed in claim 1, wherein:
    the cover comprises a receiving device formed as a hollow body open towards the cavity and projecting into the cavity; and
    the pressure-balancing element is arranged inside the receiving device.

3. The housing block as claimed in claim 2, wherein the throttle opening opens into the receiving device on a base of said receiving device.

4. The housing block as claimed in claim 2, wherein the pressure balancing element is spaced apart from a base of the cover in which the throttle opening is formed such that an intermediate space is provided between the throttle opening and the pressure-balancing element.

5. The housing block as claimed in claim 1, wherein the dimensions of the throttle opening are such that a quotient of the length and the diameter of the throttle opening is between 1.0 and 2.0.

6. The housing block as claimed in claim 5, wherein the dimensions of the throttle opening are such that the quotient of the length and the diameter of the throttle opening is less than 1.5.

7. The housing block as claimed in claim 1, wherein the pressure-balancing element comprises a porous filter body made from at least one of a foamed material and a sintered material.

8. The housing block as claimed in claim 7, wherein the filter body is made from at least one of a plastic material, a metal material, and a ceramic material.

9. The housing block as claimed in claim 1, wherein the pressure-balancing element is permeable to liquid and gaseous media in a first direction from the environment into the interior of the cavity and the pressure-balancing element is permeable to liquid and gaseous media in an opposite second direction from the interior of the cavity to the environment.

10. The housing block as claimed in claim 1, wherein:
    the cavity forms a storage chamber of a pressure medium accumulator which receives a displaceable piston which is movable against a return force of a spring elastic element;
    the piston divides the storage chamber into a first storage chamber, which is connected to a pressure medium supply, and a gas-filled second storage chamber, which is sealed against the first storage chamber; and
    the cover closes the second storage chamber against the environment.

11. A housing block for a hydraulic unit of an electronically slip-controllable vehicle brake system, the housing block comprising:
    a cavity formed on the housing block and open towards an outside of the housing block;
    a cover closing an opening of the cavity against the environment and
    a device configured to vent the cavity to the environment, the device including:
        a throttle opening formed on the cover, the throttle opening having a length and a diameter; and
        a pressure-balancing element configured to be attached to that side of the cover facing the cavity, the pressure-balancing element covers an opening cross-section of the throttle opening in the cavity,
    wherein:
        on the side of the cover facing the cavity, a receiving device is formed as a hollow body open towards the cavity;
        the pressure-balancing element is arranged inside the receiving device;
        the receiving device is formed as a peg; and
        an outer periphery of the receiving device centers a component arranged in the cavity.

12. The housing block as claimed in claim 11, wherein the component is one of a coil spring and an elastomer body.

* * * * *